United States Patent
Ikeda et al.

(10) Patent No.: US 9,024,566 B2
(45) Date of Patent: May 5, 2015

(54) MOTOR CONTROL DEVICE

(75) Inventors: Hidetoshi Ikeda, Tokyo (JP); Hiroyuki Sekiguchi, Tokyo (JP); Yuji Igarashi, Tokyo (JP); Shuya Sano, Tokyo (JP); Takashi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 13/879,097

(22) PCT Filed: Oct. 7, 2011

(86) PCT No.: PCT/JP2011/073212
§ 371 (c)(1),
(2), (4) Date: Apr. 12, 2013

(87) PCT Pub. No.: WO2012/060180
PCT Pub. Date: May 10, 2012

(65) Prior Publication Data
US 2013/0214718 A1    Aug. 22, 2013

(30) Foreign Application Priority Data
Nov. 5, 2010   (JP) .................. 2010-248432

(51) Int. Cl.
G05B 11/36 (2006.01)
G05B 6/02 (2006.01)
G05B 11/42 (2006.01)

(52) U.S. Cl.
CPC ........ *G05B 6/02* (2013.01); *G05B 11/42* (2013.01); *G05B 2219/41152* (2013.01)
USPC .......................................... 318/609; 318/610

(58) Field of Classification Search
USPC .................... 318/609, 610, 461, 727, 632
See application file for complete search history.

(56) References Cited

U.S. PATENT DOCUMENTS 5,504,404 A * 4/1996 Tamaki et al. ................ 318/432
7,106,017 B2 * 9/2006 Kifuku et al. ............ 318/400.22
(Continued)

FOREIGN PATENT DOCUMENTS

CN         1692548 A        11/2005
JP       2002 27772          1/2002
(Continued)

OTHER PUBLICATIONS

Odai, M., et al., "Controller Design Robust to Nonlinear Elements based on Fractional Order Control System," T. IEE Japan, vol. 120-D, No. 1, pp. 11-18, (2000) (with English abstract).
(Continued)

*Primary Examiner* — Rina Duda
(74) *Attorney, Agent, or Firm* — Oblon, McClelland, Maier & Neustadt, L.L.P.

(57) ABSTRACT

A motor control device includes a feedback filter that has filter characteristics that a frequency response gain is substantially one at frequencies equal to or lower than a filter cutoff frequency, a frequency response gain decreases with increase in frequency in a range from the filter cutoff frequency $\omega fL$ to a filter upper limit frequency $\omega fH$ higher than the filter cutoff frequency $\omega fL$, and a frequency response gain is substantially constant at frequencies equal to or higher than the filter upper limit frequency $\omega fH$, and performs computing to apply the filter characteristics to a feedback transfer function, wherein a control-constant set unit sets a speed gain Kv and at least one of the filter cutoff frequency $\omega fL$ and the filter upper limit frequency $\omega fH$ to reduce a ratio of the filter upper limit frequency $\omega fH$ to the filter cutoff frequency $\omega fL$ with increase in the speed gain Kv.

7 Claims, 6 Drawing Sheets

(56) References Cited

U.S. PATENT DOCUMENTS

| | | | |
|---|---|---|---|
| 7,183,738 B2 | 2/2007 | Ikeda et al. | |
| 7,257,478 B2 * | 8/2007 | Sugano | 701/96 |
| 7,389,172 B2 * | 6/2008 | Sugano | 701/96 |
| 8,050,825 B2 | 11/2011 | Ikeda et al. | |

FOREIGN PATENT DOCUMENTS

| | | |
|---|---|---|
| JP | 2005 328607 | 11/2005 |
| JP | 2007 134823 | 5/2007 |
| WO | 2005 064781 | 7/2005 |

OTHER PUBLICATIONS

International Search Report Issued Dec. 13, 2011 in PCT/JP11/73212 Filed Oct. 7, 2011.

Office Action issued Jan. 6, 2015 in Chinese Patent Application No. (with English Translation).

* cited by examiner

MOTOR CONTROL DEVICE

FIELD

The present invention relates to a motor control device that controls the speed and position of a motor.

BACKGROUND

The motor control device that controls the speed and position of a motor generally performs a speed proportional-integral (PI) control or a control with a feedback loop that is configured using a filter or the like. Control constants that define characteristics of these controls need to be set according to characteristics of a mechanical system to be driven, and thus it is desired that high-speed and high-accuracy control be realized with setting and/or adjustment as simple as possible.

To satisfy this desire, for example, Patent Literature 1 discloses a technique related to a motor control device that has a speed control unit that performs PI control, a torque filter unit in which a low-pass filter is commonly used, and the like, and sets various control constants for setting characteristics of these units based on one parameter inputted from the external according to a specific relational expression.

Meanwhile, when the low-pass filter as in the above is used, stable control is difficult in a case where a mechanical system to be driven has a low rigidity and higher inertia than that of the motor. To solve this problem, a technique intended for a mechanical system which is two-inertia system having a larger load is disclosed in Patent Literature 2.

According to the technique described in Patent Literature 2, a proportional gain (speed gain) of a speed control unit can be stably increased using a phase-lag filter having characteristics that the frequency response gain is constant in a low-frequency region lower than a set first filter frequency and in a high-frequency region higher than a set second filter frequency and that phase lag occurs and the frequency response gain decreases with increase in frequency in an intermediate frequency region therebetween. The "frequency response gain" is hereinafter referred to simply as "gain" when there is no potential for confusion. Patent Literature 2 also discloses a technique in which a parameter set unit is provided to enable to automatically set the first filter frequency and the second filter frequency. As a set method of these frequencies, there is disclosed a method in which the first and second filter frequencies are set based on the proportional gain (speed gain) of the speed control unit, an inertia value of the whole mechanical system and an inertia value of the motor itself with reference to a first crossover frequency $\omega C1$ considered in terms of the inertia of the whole mechanical system and a second crossover frequency $\omega C2$ considered in terms of the inertia of only the motor. Alternatively, there is also disclosed a method in which the frequencies are set with reference to an antiresonant frequency or resonant frequency of the mechanical system.

CITATION LIST

Patent Literatures

Patent Literature 1: Japanese Patent Application Laid-open No. 2002-027772
Patent Literature 2: International Publication No. WO 2005/064781

Non Patent Literature

Non Patent Literature 1: authored by Odai and Hori, "Controller Design Robust to Nonlinear Elements based on Fractional Order Control System", The transactions of the Institute of Electrical Engineers of Japan, D, 2000, Vol. 120, No. 1, pp. 11-18

SUMMARY

Technical Problem

However, when the common low-pass filter used in the technique described in Patent Literature 1 is used, phase lag due to the low-pass filter occurs. When the inertia of a mechanical system to be driven is considerably larger than that of the motor, the frequency response gain of the control object becomes large in higher frequencies and thus the control system adversely becomes unstable. Furthermore, oscillation is likely to occur also in a mechanical system with complicated characteristics that have a plurality of mechanical resonances and accordingly it is difficult to perform a stable control.

Patent Literature 2 shows a configuration to stably control a low-rigidity mechanical system using a phase-lag filter. However, its setting method only covers two-inertia systems as the control object. Therefore, in the method of setting the first and second filter frequencies with reference to the first crossover frequency $\omega C1$ and the second crossover frequency $\omega C2$, a relation between the first and second filter frequencies is determined only based on a ratio between the inertia of the mechanical system to be driven and the inertia of the motor. As a result, when the load inertia is not so high, a difference between the first crossover frequency $\omega C1$ and the second crossover frequency $\omega C2$ is small, thus leading to small effect of reducing the high frequency gain by using the filter. Furthermore, practical mechanical systems are different from the ideal two-inertia systems mentioned above and have complicated characteristics with a plurality of resonances in many cases, and a factor such as a dead time is included in the feedback loop. Because the parameter set unit described in Patent Literature 2 does not cover these points, the speed gain of a speed controller can not be sufficiently increased in some cases, which complicates realization of high-accuracy control.

The present invention has been achieved in view of the above circumstances, and an object of the present invention is to provide a motor control device that can realize high-speed and high-accuracy control for mechanical systems with a range of characteristics as wide as possible.

Solution to Problem

In order to solve the above-mentioned problems and achieve the object, the present invention provides a motor control device that drives a motor included in a control object, the motor control device comprising: a speed detection unit that detects a motion speed of the motor and outputs a detection speed; a control computation unit that computes a drive force command for the motor to conform the detection speed with a speed command; an amplifier compensation unit that performs computing of multiplying a feedback transfer function that is a transfer function from the detection speed to the drive force command by a speed gain Kv within the control computation unit; a feedback filter that has filter characteristics that a frequency response gain is substantially one at frequencies equal to or lower than a filter cutoff frequency, a frequency response gain decreases with increase in frequency in a range from the filter cutoff frequency to a filter upper limit frequency higher than the filter cutoff frequency, and a frequency response gain is substantially constant at frequencies equal to or higher than the filter upper limit frequency, and performs computing to apply the filter characteristics to the feedback transfer function within the control computation unit; a control-constant set unit that sets the speed gain Kv and at least one of the filter cutoff frequency and the filter upper limit frequency according to an input from the external; and a drive-force control unit that drives the motor to match a drive force of the motor with the drive force command, wherein the control-constant set unit sets the speed gain Kv and at least one of the filter cutoff frequency and the filter upper limit frequency to decrease a ratio of the filter upper limit frequency to the filter cutoff frequency with increase in the speed gain Kv.

Advantageous Effects of Invention

According to the present invention, gains at higher frequencies can be decreased while a frequency range in which the phase of a feedback filter lags is narrowed with increase in the speed gain Kv. Therefore, a high-speed and high-accuracy control can be realized for a mechanical system with a range of characteristics as wide as possible.

DESCRIPTION OF EMBODIMENTS

Embodiments of a motor control device according to the present invention will be described below in detail with reference to the drawings. The present invention is not limited to the embodiments.

First Embodiment

Figure 1:
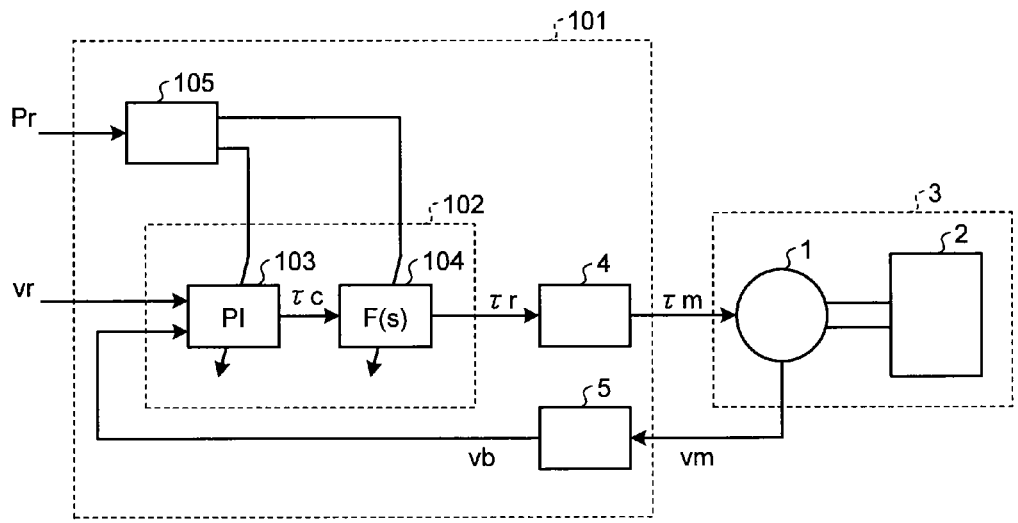
FIG. 1 is a block diagram showing a motor control device according to a first embodiment.

FIG. 1 is a block diagram representing a general configuration of a motor control device according to a first embodiment of the present invention. A motor control device 101 causes a motor 1 to generate a torque (drive force) τm for the motion of the motor 1 to follow the motion command based on a speed command vr as a motion command inputted from the external, a motion (speed) vm of the motor 1 detected using a motion detector (not shown) such as an encoder, and a response parameter Pr set through input from the external. The motor 1 drives a mechanical system 3 including the motor 1 and a mechanical load 2 connected to the motor 1 by generation of the torque τm. While the motor 1 is assumed as a rotary motor and terms of a rotary system including a torque are used below, the motor 1 is not particularly limited to the rotary type and may be a linear motor that generates a thrust (drive force).

The motor control device 101 includes a torque control unit (drive-force control unit) 4, a speed detection unit 5, a control computation unit 102, and a control-constant set unit 105.

The speed detection unit 5 computes a speed at which the motor 1 moves based on the detected motion vm of the motor 1, and outputs the computed speed as a detection speed vb. The control computation unit 102 includes an amplifier compensation unit 103 that performs compensation amplification computing and a feedback filter 104 that performs filter computing, and outputs a torque command τr obtained through computing of feedback control for the detection speed vb to follow the speed command vr based on the speed command vr as the motion command and the detection speed vb. The torque control unit 4 controls a current of the motor 1, thereby performing control to match the torque τm generated from the motor 1 with the torque command τr.

The control-constant set unit 105 sets characteristics of the computing operation of the control computation unit 102 including the amplifier compensation unit 103 and the feedback filter 104, that is, constants to be used in the computing based on the response parameter Pr set from the external in a manner explained later.

[Computing of Control Computation Unit 102]

Now, a computing process of the control computation unit 102 including the amplifier compensation unit 103 and the feedback filter 104 is explained.

The control computation unit 102 receives the speed command vr and the detection speed vb. Within the control computation unit 102, the amplifier compensation unit 103 performs computing of a usual proportional-integral control for the detection speed vb to follow the speed command vr based on the speed command vr and the detection speed vb. That is, computing according to the following expression is performed through proportional compensation of multiplying a speed deviation, which is a deviation between the speed command vr and the detection speed vb, by a speed gain Kv, and integral compensation in which the inverse of an integral time constant is $\omega i$ to output a compensation torque τc as an intermediate variable in the control computation unit 102. In the next and subsequent expressions, "s" is a Laplace operator and 1/s denotes integration.

$$\tau c = Kv \cdot \{1 + (\omega i/s)\}(vr - vb) \quad \text{(Expression 1)}$$

The feedback filter 104 receives the compensation torque τc outputted from the amplifier compensation unit 103 as an input, and outputs the torque command τr through computing of a transfer function F(s) to relatively reduce the frequency response gain at higher frequencies than a predetermined filter cutoff frequency $\omega fL$. The feedback filter 104 has frequency response characteristics, as a filter property, that the gain is substantially one in a low frequency region lower than the filter cutoff frequency $\omega fL$, the gain decreases with increase in frequency in an intermediate frequency region from the filter cutoff frequency $\omega fL$ to a filter upper limit frequency $\omega fH$ higher than the filter cutoff frequency $\omega fL$, and the gain is substantially constant in a high frequency region higher than the filter upper limit frequency $\omega fH$. Contents of a computing process of the feedback filter 104 are explained in detail later.

While phase characteristics of the feedback filter 104 are not mentioned above, a filter to be used for the feedback control is practically within a category called minimum phase shift system and thus the phase characteristics are uniquely determined when the characteristics of the frequency response gain are determined. Specifically, when being provided with the gain characteristics mentioned above, the feedback filter 104 accordingly has phase characteristics that the phase relatively lags in the intermediate frequency region.

Through this computing, the control computation unit 102 performs computing in which a transfer function (hereinafter, described as feedback transfer function) from the detection speed vb to the torque command τr is represented by the following expression 2. That is, the control computation unit 102 performs computing to multiply the feedback transfer function by the speed gain Kv through the computing of the amplifier compensation unit 103 and to apply the filter characteristics mentioned above to the feedback transfer function through the computing of the feedback filter 104.

$$\tau r/vb = -F(s) \cdot Kv\{(s+Kpi)/s\} \quad \text{(Expression 2)}$$

[Characteristics of Control Object]

Now, general characteristics of the mechanical system 3 to be driven by the motor control device 101 according to the present invention, the torque control unit 4, and the speed detection unit 5 are explained below. While the computing characteristics of the control computation unit 102 that performs the computing of the torque command τr based on the detection speed vb are set according to the characteristics of the mechanical system 3 to be driven, the torque control unit 4 and the speed detection unit 5 are configured to have normally fixed characteristics that do not depend on the characteristics of the mechanical system 3. Therefore, characteristics from the torque command τr to the detection speed vb, that is, a combined part of the torque control unit 4, the mechanical system 3 and the speed detection unit 5 is referred to as a control object.

Characteristics in a case where the mechanical system 3 is assumed to be an ideal rigid body are explained first. In this case, a transfer function from the torque τm generated from the motor 1 to the mechanical system 3, that is, the actual motion speed of the motor 1 has pure integral characteristics. That is, the gain of the frequency response decreases with increase in frequency at a slope of −20 [dB/dec] and the phase is constant in −90 [deg]. Meanwhile, the characteristics of the torque control unit 4, that is, the transfer characteristics of the torque τm generated by the motor 1 in response to the torque command τr have some lag. The speed detection unit 5 computes the detection speed vb, for example, through a difference operation of an output of the encoder that has detected the motion of the motor 1 as mentioned above. However, a certain amount of time is required for transmission of a signal and the computing process, and therefore the detection speed vb becomes a signal having some delay as compared with the speed at which the motor 1 actually moves.

Figure 2:
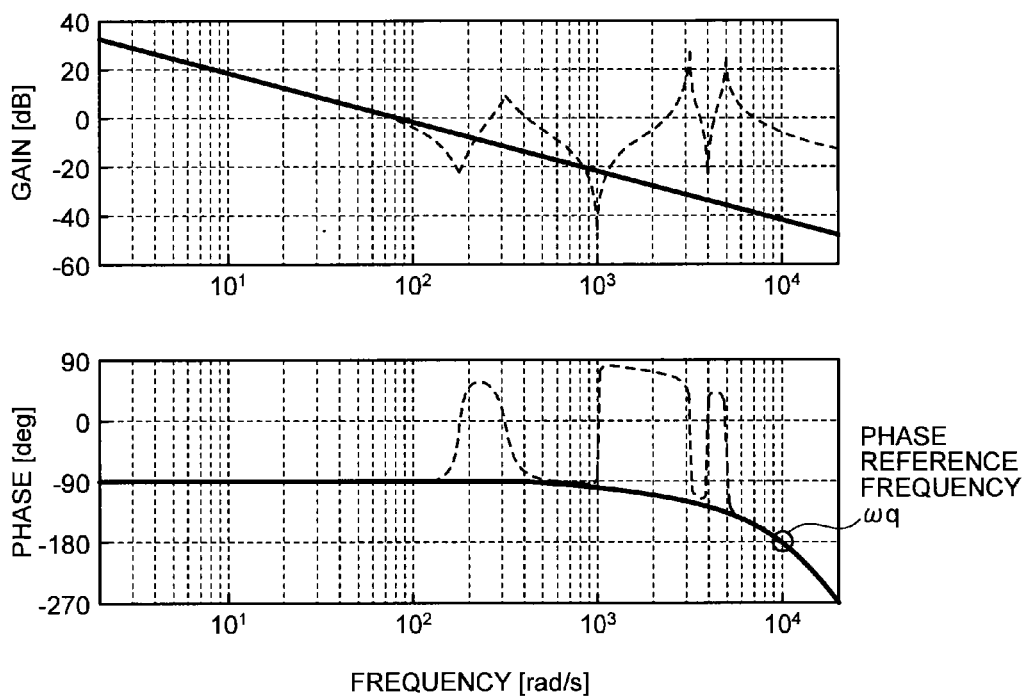
FIG. 2 is a graph showing a frequency response of a control object of the motor control device.

FIG. 2 depicts a frequency response of the control object including the torque control unit 4, the mechanical system 3 and the speed detection unit 5, that is, characteristics from the torque command τr to the detection speed vb. Solid lines in FIG. 2 indicate characteristics in a case where the mechanical system 3 is the ideal rigid body mentioned above. The gain of the control object decreases substantially at −20 [dB/dec] with increase in frequency similarly to the mechanical system 3. The phase has characteristics that the phase lag increases as the frequency increases because the torque control unit 4 and the speed detection unit 5 has some delay that is approximated to the dead time as mentioned above.

Herein, a frequency at which the sum of phase lags occurring in the torque control unit 4 and the speed detection unit 5 is −90 [deg] is referred to as a phase reference frequency ωq.

As shown in FIG. 2, the phase characteristic of the control object is directed to −180 [deg] at the phase reference frequency ωq.

The phase reference frequency ωq is determined only by the phase lag characteristics of the torque control unit 4 and the speed detection unit 5 and thus can be determined by determining the frequency response from the torque command τr to the detection speed vb in a state where only the motor 1 is driven by the motor control device 101. Alternatively, the phase reference frequency ωq can be determined as a frequency of oscillation occurring when the control computation unit 102 is caused to have characteristics of a simple speed proportional control and the control gain thereof is increased in the same state where only the motor 1 is driven. That is, the phase reference frequency ωq can be determined beforehand without the mechanical load 2 being actually connected to the motor 1 and driven. In the present embodiment, the phase reference frequency is defined as 10000 [rad/s] as an example.

Practical characteristics in a case where the mechanical system 3 is not an ideal rigid body are explained next. The mechanical system 3 generally has a plurality of mechanical resonances due to a low rigidity of a coupling or shaft (not shown) that connects the motor to the mechanical load 2, or the mechanical load 2 itself. Furthermore, in many motors for industrial applications, the motor 1 and a motion detector such as an encoder (not shown) are configured in an integrated manner and a condition called collocation is met in which a drive-force generation part and a motion detecting part are sufficiently close to each other. In this case, it is theoretically known that anti-resonances and resonances alternately appear with increase in frequency and the phase does not lag by more than −90 [deg] in a transfer function from a generation torque of the motor 1 to an actual speed of the motor 1. That is, the phase lag does not become larger over all frequencies than in the case where the mechanical system 3 is an ideal rigid body.

Broken lines in FIG. 2 indicate one example of the frequency response from the torque command τr to the detection speed vb in a case where the mechanical system 3 is not an ideal rigid body, that is, in a case where the rigidity is low and there are mechanical resonances. As shown in FIG. 2, anti-resonances showing notch characteristics of the gain and resonances showing peak characteristics alternately appear with increase in frequency. Furthermore, the gain increases between the anti-resonance frequency and the resonance frequency with increase in frequency. As a result, the gain generally increases as the frequency becomes higher compared to the case indicated by the solid line in which the mechanical system 3 is an ideal rigid body. The increases in gain at higher frequencies are generally larger when the inertia of the motor 1 is lower than the inertia of the whole mechanical system 3. Meanwhile, the phase characteristics are such that while the phase changes in a direction of advance by 180 [deg] near the anti-resonance frequencies and changes in a direction of lag by 180 [deg] near the resonance frequencies with increase in frequency, the phase is not lagged compared to the case where the mechanical system 3 is an ideal rigid body. As result, the phase does not lag larger than −180 [deg] at frequencies lower than the above-mentioned phase reference frequency ωq.

[Details of Feedback Filter 104]

Details of the configuration of the feedback filter 104 according to the first embodiment are explained below. The feedback filter 104 has a transfer function with a denominator and a numerator that each have the same predetermined order n (n is an integer equal to or larger than one). That is, the feedback filter 104 performs computing represented by the transfer function of the following expression using a denominator polynomial Df(s) and a numerator polynomial Nf(s) which are represented by polynomials of s having n-th-order, respectively.

$$F(s)=Nf(s)/Df(s) \quad \text{(Expression 3)}$$

The feedback filter 104 in the present embodiment performs computing in which the denominator polynomial Df(s) and the numerator polynomial Nf(s) are represented by products of n polynomials as the following expressions using frequencies of n poles (hereinafter, simply "poles") $\omega p\_i$ [rad/s] and frequencies of n zero-points (hereinafter, simply "zero points") $\omega z\_i$ [rad/s], respectively. In this case, each of "i" in "\_i" which indicates the suffix, is an integer from 1 to n.

$$Df(s)=\{(1/\omega p\_1)s+1\} \ldots \{(1/\omega p\_n)s+1\} \quad \text{(Expression 4)}$$

$$Nf(s)=\{(1/\omega z\_1)s+1\} \ldots \{(1/\omega z\_n)s+1\} \quad \text{(Expression 5)}$$

In (Expression 4) and (Expression 5), the n poles $\omega p\_i$ are assigned with the suffixes i in the ascending order and similarly the n zero points $\omega z\_i$ are assigned with the suffixes i in the ascending order. The first, or the lowest pole $\omega p\_1$ is associated with the above-mentioned filter cutoff frequency $\omega fL$, the nth, or the highest zero point $\omega z\_n$ is associated with the filter upper limit frequency $\omega fH$, and the first to nth poles $\omega p\_i$ and zero points $\omega z\_i$ are set to alternate the pole and the zero point in the ascending order of absolute values thereof. That is, the poles $\omega p\_i$ and the zero points $\omega z\_i$ are set to have the following relationship.

$$\omega fL=\omega p\_1<\omega z\_1<\ldots<\omega p\_n<\omega z\_n=\omega fH \quad \text{(Expression 6)}$$

Figure 3:
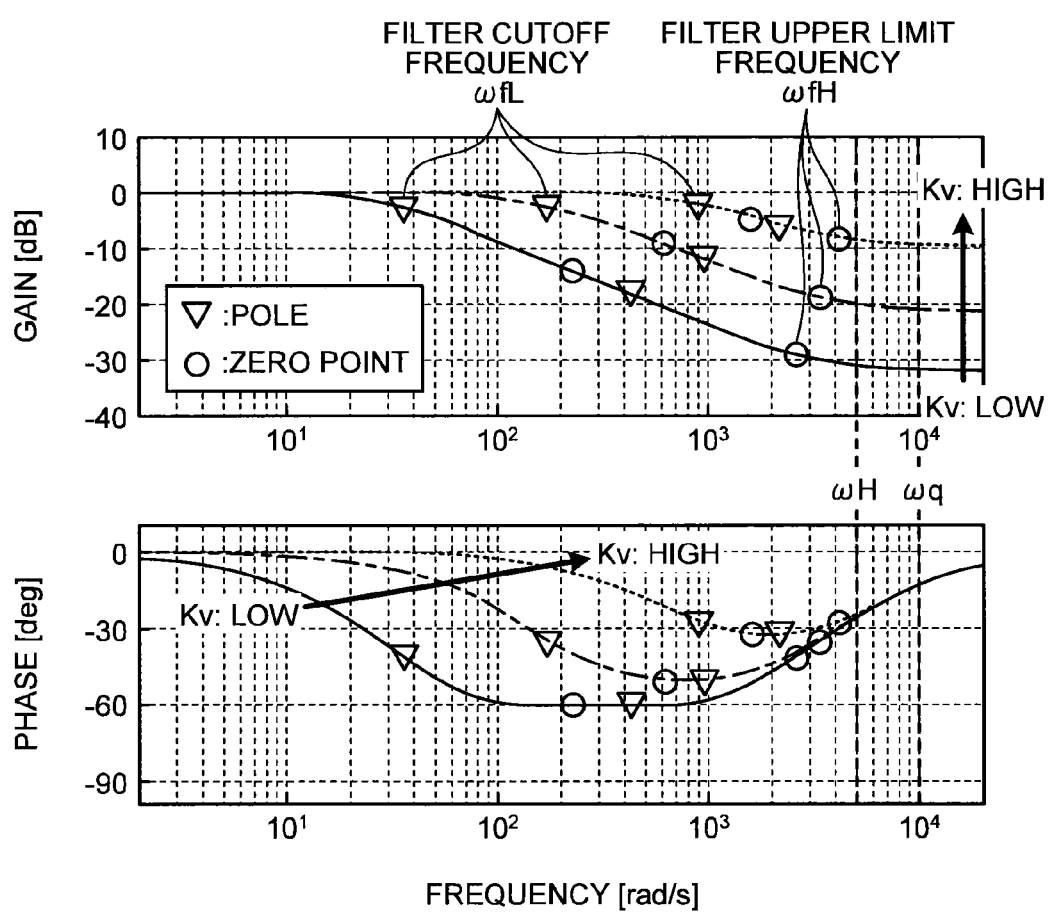
FIG. 3 is a graph showing a frequency response of a feedback filter according to the first embodiment.

As a result of this setting, the frequency response characteristics of the feedback filter 104 represented by (Expression 3) to (Expression 5) are such that the gain is substantially one in a low frequency region lower than the filter cutoff frequency $\omega fL$, that is, the lowest pole $\omega p\_1$, the gain decreases as the frequency increases in an intermediate frequency region between the filter cutoff frequency $\omega fL$ and the filter upper limit frequency $\omega fH$, and the gain is substantially constant in a high frequency region higher than the filter upper limit frequency $\omega fH$, that is, the highest zero point $\omega z\_n$ to converge to Gh represented by the following expression 7, as shown in FIG. 3, which is explained later in detail.

$$Gh=(\omega z\_1 \ldots \omega z\_n)/(\omega p\_1 \ldots \omega p\_n) \quad \text{(Expression 7)}$$

Furthermore, the phase characteristics of the transfer function F(s) of the feedback filter 104 are such that the phase is between −90 [deg] and 0 [deg] in the intermediate frequency region between the filter cutoff frequency $\omega fL$ and the filter upper limit frequency $\omega fH$, the phase approaches zero as the frequency decreases in the low frequency region lower than the filter cutoff frequency $\omega fL$, and the phase approaches zero as the frequency increases in the high frequency region higher than the filter upper limit frequency $\omega fH$. Therefore, the feedback filter 104 has characteristics that the phase is larger than −90 [deg] over all frequencies.

[Operation of the Control-Constant Set Unit]

An outline of operations of the control-constant set unit 105 is explained. The response parameter Pr is inputted from the external to the control-constant set unit 105. The response parameter Pr is for setting a response speed of the motor control device 101 that operates to match the detection speed vb with the speed command vr, and may be either a continuous value such as a frequency indicating the response speed or a time constant of an inverse thereof, or a stepwise parameter such as large/medium/small. The response parameter Pr is determined according to an application to which the motor control device 101 is applied and/or characteristics of the mechanical system 3 to be driven, and considering stability of the control system or a desired response speed. The speed gain Kv itself may be inputted as the response parameter Pr.

When the response speed of the motor control device 101 is to be set higher, the control-constant set unit 105 have an input of the response parameter Pr to set the speed gain Kv in the computing of (Expression 1) in the amplifier compensation unit 103 of the control computation unit 102 to have a higher level. The inverse of the integral time constant is set at a value about 0.1 to 0.5 time as large as a gain crossover frequency $\omega c$ obtained by dividing the speed gain Kv by an inertia value J of the mechanical system 3. At the same time as this setting of the amplifier compensation unit 103, the control-constant set unit 105 sets the characteristics of the feedback filter 104 as follows. The inertia value J may be inputted from the external as a set value or may be determined by estimation based on the torque command τr and the detection speed vb.

The control-constant set unit 105 also sets the filter cutoff frequency $\omega fL$ at a value between a similar value and a slightly larger value than the gain crossover frequency $\omega c$, usually at a value about 1 to 5 times as large as the gain crossover frequency $\omega c$. The filter upper limit frequency $\omega fH$ is set at a value slightly smaller than the phase reference frequency $\omega q$ mentioned above, usually at a value about 0.2 to 1 time as large as the phase reference frequency $\omega q$. For ease of explanations, the description will be directed to a case where the gain crossover frequency $\omega c$ is sufficiently lower than the phase reference frequency $\omega q$ and accordingly the filter cutoff frequency $\omega fL$ is set smaller than the filter upper limit frequency $\omega fH$ in the setting mentioned above.

In a case where a certain mechanical system 3 is to be driven, when the speed gain Kv is increased, the gain crossover frequency $\omega c$ increases in proportion to the speed gain Kv. Meanwhile, the phase reference frequency $\omega q$ has a value that does not depend on the speed gain Kv. Therefore, the control-constant set unit 105 performs setting such that a ratio of the filter upper limit frequency $\omega fH$ to the filter cutoff frequency $\omega fL$ is reduced when the speed gain Kv is increased according to input of the response parameter Pr. As a result, the intermediate frequency region mentioned above, that is, a frequency range in which the phase lag of the feedback filter 104 is large is narrowed on a logarithmic axis with increase in the speed gain Kv.

With the operation of the control-constant set unit 105 mentioned above, the feedback filter 104 has frequency response characteristics of reducing the gain at frequencies somewhat higher than the gain crossover frequency $\omega c$ without too much increasing the phase lag near the gain crossover frequency $\omega c$ and reducing the phase lag also near the phase reference frequency $\omega q$.

[Details of Feedback Filter Setting]

Details of the setting of the feedback filter 104 performed by the control-constant set unit 105, the outline operation of which has been explained above, are explained below. The control-constant set unit 105 calculates an upper reference frequency $\omega H$ by multiplying the phase reference frequency $\omega q$ by a predetermined constant rH. The constant rH is substantially in a range from 0.2 to 1. Because the phase reference frequency $\omega q$ and the constant rH can be previously defined, the upper reference frequency $\omega H$ itself may be previously defined. The control-constant set unit 105 also calculates a lower reference frequency $\omega L$ by multiplying the gain crossover frequency $\omega c$ which is determined according to the inputted response parameter Pr, by a predetermined constant rL. The constant rL is set substantially in a range from 1 to 5. That is, the upper reference frequency ωH and the lower reference frequency ωL are calculated in the following expressions.

$$\omega H = rH \cdot \omega q \quad \text{(Expression 8)}$$

$$\omega L = rL \cdot \omega c \quad \text{(Expression 9)}$$

In the control-constant set unit 105, n constants αp_i corresponding to the poles ωp_i of the filter as many as the order number n of the feedback filter 104 mentioned above, and n constants αz_i corresponding to the n zero points ωz_i (i is an integer from 1 to n) are previously set to meet a relation according to the following expression 10.

$$0 \le \alpha p\_1 < \alpha z\_1 < \ldots < \alpha p\_n < \alpha z\_n \le 1 \quad \text{(Expression 10)}$$

The control-constant set unit 105 calculates the n poles ωp_i and the n zero points ωz_i in the feedback filter 104 by the following expressions using the upper reference frequency ωH, the lower reference frequency ωL, and the n constants αp_i and n constants αz_i previously set, and sets the calculated poles and zero points.

$$\omega p\_i = \{\omega L^{(1-\alpha p\_i)}\} \cdot \omega H^{(\alpha p\_i)} \quad \text{(Expression 11)}$$

$$\omega z\_i = \{\omega L^{(1-\alpha z\_i)}\} \cdot \omega H^{(\alpha z\_i)} \quad \text{(Expression 12)}$$

With the setting according to the above expressions, the ith pole ωp_i is set to a frequency obtained by dividing a range between the upper reference frequency ωH and the lower reference frequency ωL at a ratio of αp_i:(1−αp_i) on an axis on which the frequency is expressed logarithmically. Similarly, the ith zero point ωz_i is set to a frequency obtained by dividing the range between the upper reference frequency ωH and the lower reference frequency ωL at a ratio of αz_i:(1−αz_i) on the logarithmic axis. Because ωp_1 is the filter cutoff frequency ωfL and ωz_n is the filter upper limit frequency ωfH as mentioned above, the poles and the zero points of the feedback filter 104 are set to meet (Expression 6) by setting the constants αp_i and αz_i according to (Expression 10).

In the calculation according to (Expression 11) and (Expression 12), there is performed calculation with an exponent of a rational number not smaller than 0 and not larger than 1, not limited to an integer, using the constants αp_and αz_i. To realize this calculation, it is preferable to select the n constants αp_i and n constants αz_i to meet (Expression 10) and to be represented by products of values obtained by multiplying (½) by itself as many times as a predetermined integer "a" and a predetermined integer "b", respectively. The number "a" of the number of times of multiplications of (½) can have different values according to "i" or between αp_i and αz_i. Similarly, the integer "b" can have different values according to "i" or between αp_i and αz_i. In this way, in (Expression 11) and (Expression 12), exponentiation operations having αp_i and αz_i which are not integers as exponents can be realized, for example, by "a" sets of square-root operations and "b" sets of multiplication operations for the upper reference frequency ωH, and can be realized without using an expensive computing device even with computation that can be installed therein.

A theoretical background related to the setting of the feedback filter 104 by the control-constant set unit 105 is added below. For ease of theoretical explanations, it is assumed that ωfL<<ωfH and that the order n of the feedback filter 104 is a sufficiently-large integer. It is the case to be considered that the magnitude relation represented by (Expression 6) and the same relation as that in the approximation realization method of a fractional order integration described in Chapter 5 in Non Patent Literature 1 are provided to the poles ωp_i and the zero points ωz_i of the feedback filter 104.

For this purpose, the n constants αp_i and the n constants αz_i are set to be arithmetic sequences having intervals Δα between adjacent ones, respectively, and also in such a manner that a difference between αz_i and αp_i is k (0<k<1) times as large as Δα. In this case, the transfer function F(s) of the feedback filter 104 is approximated to characteristics of a fractional order integration represented by the following expression at frequencies between ωfL and ωfH. The constant k in the following expression is a rational number having a relation of 0≤k≤1.

$$F(s) = 1/(s^k) \quad \text{(Expression 13)}$$

The phase of the fractional order integration of the k-th order represented by Expression 13 is constant to be −90 k [deg]. Therefore, when the control-constant set unit 105 and the feedback filter 104 are configured as in the present embodiment and ωp_i and ωz_i are set in such a manner that the fractional order k based on the theoretical background has a desired value, it is possible to set the phase to have a desired value between −90 [deg] to 0 [deg] in a frequency range between ωfL and ωfH even when the frequency range is wide.

Specific Example

The control by the motor control device 101 according to the present embodiment is specifically explained using numerical values. FIG. 3 depicts a frequency response of the transfer function F(s) of the feedback filter 104 according to the present embodiment. In this specific example, the order n of the feedback filter 104 is two. In FIG. 3, there are shown three cases where the speed gain Kv in the amplifier compensation unit 103 is set to different values by the operation of the control-constant set unit 105 according to changes in the response parameter Pr in a state where a certain mechanical load 2 is connected to the motor 1. A case where the speed gain Kv is low is indicated by solid lines, a case where the speed gain Kv is of an intermediate level is indicated by dot-dashed lines, and a case where the speed gain Kv is high is indicated by dotted lines. The gain is shown in an upper part of FIG. 3 and the phase is shown in a lower part thereof. The poles ωp_i of the feedback filter 104 are plotted with triangles and the zero points ωz_i are plotted with circles on the gain diagram and the phase diagram under the respective conditions. As mentioned above, the lowest pole ωp_1 corresponds to the filter cutoff frequency ωfL and the highest zero point ωz_n corresponds to the filter upper limit frequency ωfH.

The poles ωp_i and the zero points ωz_i of the feedback filter 104 shown in FIG. 3 are determined by the above-mentioned operation of the control-constant set unit 105 as follows. As shown in FIG. 2, in the specific example, the phase reference frequency ωq at which the phase lag occurring in the torque control unit 4 and the speed detection unit 5 is −90 [deg] is 10000 [rad/s] and the upper reference frequency ωH is determined according to the calculation of (Expression 8) with the predetermined constant rH being set to 0.5. The control-constant set unit 105 then determines the speed gain Kv in the amplifier compensation unit 103 according to input of the response parameter Pr from the external, and obtains the gain crossover frequency ωc having a value obtained dividing the speed gain Kv by the inertia value J of the mechanical system 3. The lower reference frequency ωL is then determined according to the calculation of (Expression 9) with the predetermined constant rL being set to 2.0 based on the gain crossover frequency ωc. The control-constant set unit 105 then uses the constants αp_i and αz_i (i=1, 2) previously determined to meet a relationship of the following expression to set the poles ωp_i and the zero points ωz_i of the feedback filter 104 according to (Expression 11) and (Expression 12).

$$0 = \alpha p\_1 < \alpha z\_1 < \alpha p\_2 < \alpha z\_2 < 1 \quad \text{(Expression 14)}$$

In the specific example, because αp_1 is set at 0 as shown in the above expression, ωp_1, that is, the filter cutoff frequency ωfL is determined to be equal to the lower reference frequency ωL, which is a constant multiple of the gain crossover frequency ωc.

When the control-constant set unit 105 sets the characteristics of the feedback filter 104 as mentioned above, the transfer function F(s) of the feedback filter 104 has frequency response characteristics that the gain reduces at higher frequencies than the filter cutoff frequency ωfL, the gain is substantially one in a frequency region lower than the filter cutoff frequency ωfL, the gain reduces as the frequency increases in an intermediate frequency region between the filter cutoff frequency ωfL and the filter upper limit frequency ωfH, and the gain is substantially constant in a frequency region higher than the filter upper limit frequency ωfH as shown in the gain diagram of FIG. 3. The control-constant set unit 105 also sets a ratio of the filter upper limit frequency ωfH to the filter cutoff frequency ωfL to be reduced as the speed gain Kv increases, based on the response parameter Pr.

As shown in the phase diagram of FIG. 3, the phase characteristics of the feedback filter 104 are configured to have the phase larger than −90 [deg] in the whole frequency region and, particularly when the speed gain Kv is low, the phase is nearly constant to have a value about 30 [deg] larger than −90 [deg] in a wide frequency range between the filter cutoff frequency ωfL and the filter upper limit frequency ωfH by virtue of an effect of alternate arrangement of the poles ωp_i and the zero points ωz_i of the feedback filter 104 as mentioned above. Such characteristics have a feature that can not be realized in a case where the order n of the feedback filter 104 is one. Furthermore, because the ratio of the filter upper limit frequency ωfH to the filter cutoff frequency ωfL decreases as the speed gain Kv increases as mentioned above, an intermediate frequency range therebetween in which the phase lags becomes narrower on the logarithmic axis.

Figure 4:
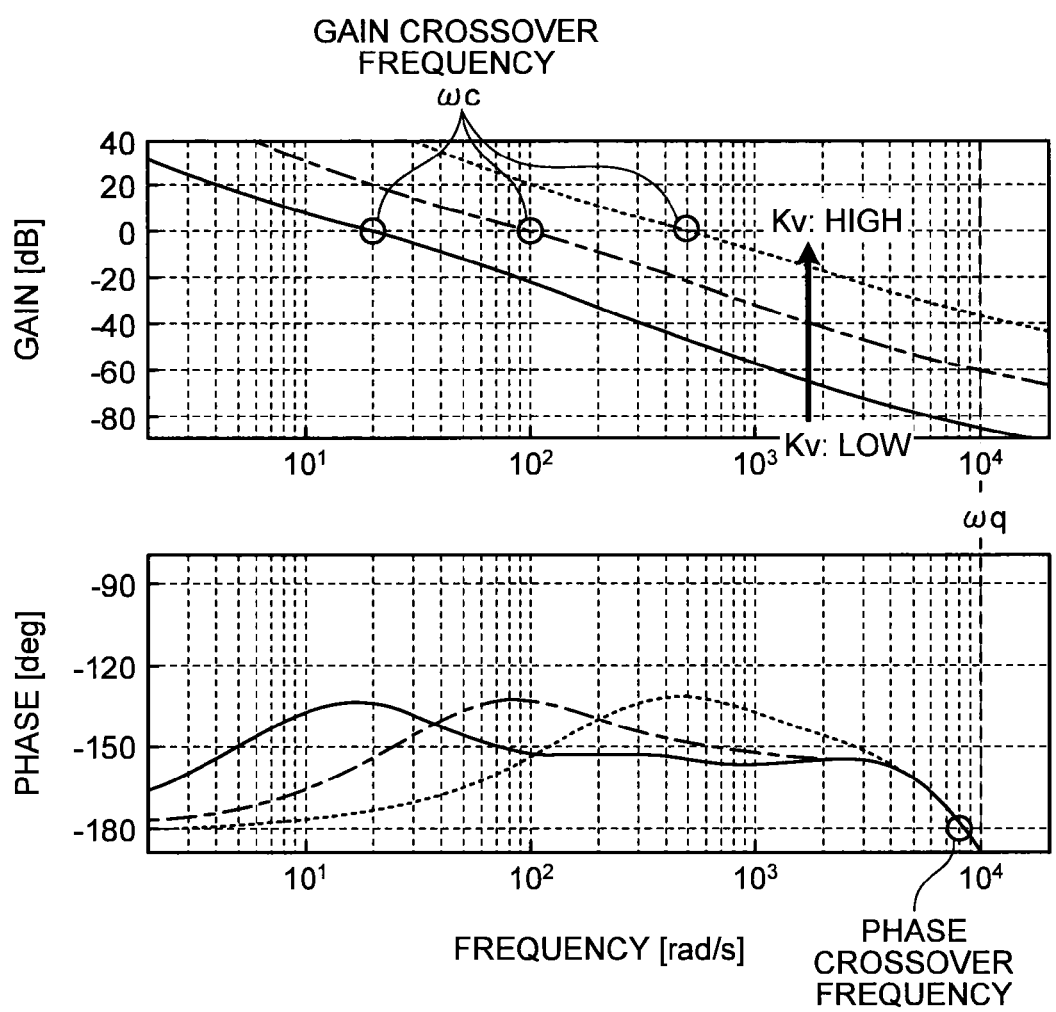
FIG. 4 is a graph showing an open-loop frequency response in the first embodiment.

A frequency response of an open-loop transfer function of a control system in a case where the mechanical system 3 is assumed to be an ideal rigid body in the specific example is shown in FIG. 4 to explain an advantageous effect obtained in the present embodiment.

FIG. 4 depicts a case where the control-constant set unit 105 sets the speed gain Kv of the amplifier compensation unit 103 to three difference values according to changes in the response parameter Pr inputted from the external, similarly to FIG. 3. The control-constant set unit 105 sets the inverse ωi of the integration time constant to be 0.3 times as large as the gain crossover frequency ωc. Similarly to FIG. 3, a case where the speed gain Kv is low is indicated by solid lines, a case where the speed gain Kv is of an intermediate level is indicated by dot-dashed lines, and a case where the speed gain Kv is high is indicated by dotted lines. As can be understood from FIG. 4, even when the speed gain Kv is changed, a phase crossover frequency at which the phase of the open-loop transfer function is −180 [deg] is almost unchanged and only becomes slightly lower than 10000 [rad/s] that is the phase reference frequency ωq shown in FIG. 3. In any case, the phase margin at the gain crossover frequency ωc is of a sufficient level and is equal to or larger than 45 [deg]. At frequencies higher than the gain crossover frequency ωc, the margin equal to or larger than about 30 [deg] with respect to −180 [deg] is kept up to at a frequency slightly lower than that phase crossover frequency. Particularly when the speed gain Kv is low, the phase is constant to have a value about 30 [deg] larger than −180 [deg] in a wide frequency range. Such characteristics have a feature that can not be realized in the case where the order n of the feedback filter 104 is one.

While the frequency response of the open-loop transfer function in the case where the mechanical system 3 is an ideal rigid body is shown in FIG. 4, the gain characteristics in the case where the mechanical system 3 is not an ideal rigid body have a different aspect in that a resonance peak appears or the gain increase as the frequency increases as mentioned above. Meanwhile, as for the phase characteristics, the phase lag does not become larger than that in the case where the mechanical system 3 is an ideal rigid body shown in FIG. 4. Therefore, even when the gain of the open-loop transfer function becomes larger than 0 [dB] at lower frequencies than the phase crossover frequency shown in FIG. 4 due to mechanical resonances or the like, instability is not caused unless the gain exceeds 0 [dB] at higher frequencies than the phase crossover frequency. Accordingly, when the phase crossover frequency is kept at a high level, the mechanical resonances at frequencies lower than the phase crossover frequency does not become unstable and thus the stability can be kept at a level as high as possible.

In this way, as shown in FIG. 3, the present embodiment is configured to narrow the frequency range in which the phase lag is large due to increase in the speed gain Kv, on the logarithmic axis, so as to prevent the phase crossover frequency from becoming lower than the phase reference frequency ωq as far as possible as shown in FIG. 4 while the gain at the high frequencies in the open-loop transfer function is reduced by the feedback filter 104. Therefore, even when the mechanical system 3 is not a kind of rigid body and, for example, has plenty of mechanical resonance, the feedback filter 104 is set according to setting of the speed gain Kv to prevent instability from being caused as far as possible by using the characteristics of the mechanical system in which collocation is established. Accordingly, a high-speed and high-accuracy control system can be robustly realized through simple adjustment of gradually increasing the speed gain Kv according to input of the response parameter Pr.

Figure 5:
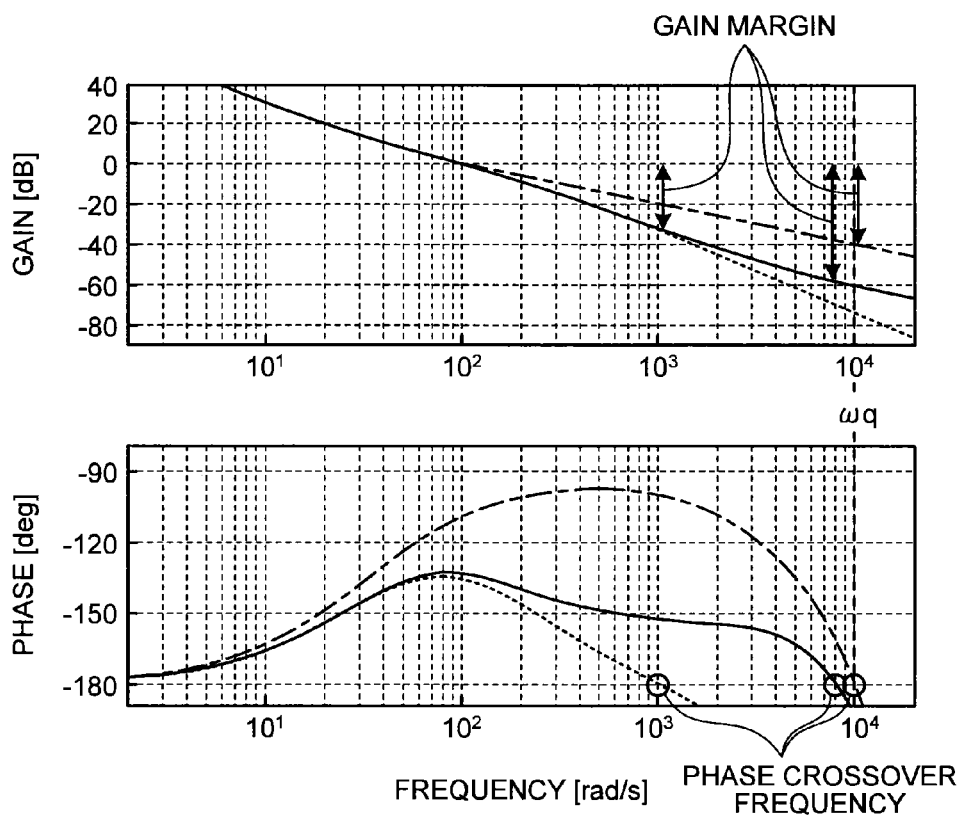
FIG. 5 is a graph showing an effect of the first embodiment by comparison of open-loop frequency responses.

FIG. 5 depicts a comparison of frequency responses of an open-loop transfer function between a case where the above-described motor control device according to the present embodiment is used and a case where the feedback filter 104 is changed to one different from that according to the present embodiment. Solid lines indicate an open-loop frequency response in the case where the motor control device according to the present embodiment is used. As comparison targets, dot-dashed lines represent a case where the feedback filter 104 in the present embodiment is changed to a direct transmission state where no filter operation is performed, and dotted lines represent a case where the feedback filter 104 is changed to a first-order low-pass filter to reduce the gain in a high frequency region as far as possible. In FIG. 5, a circle denotes a phase crossover frequency in each of the cases, and a bidirectional arrow denotes a gain margin, which is a general index of robustness. As can be understood from FIG. 5, the phase crossover frequency according to the present embodiment decreases only slightly from that in the case of no filter and does not decreases greatly as in the case of use of the low-pass filter. The gain margins are about 60 [dB], about 40 [dB], and about 35 [dB] in the present embodiment, in the case of no filter, and in the case of use of the low-pass filter, respectively, and so it is seen that the gain margin in the present embodiment is 20 [dB] or more higher than those in the other cases. That is, it is found the stability is more reliably kept depending on those differences in margin even in a case where the mechanical system 3 is not a kind of ideal rigid body and has some mechanical resonance or even in a case where the high frequency gain is increased due to a low inertia of the motor. Furthermore, such stable control characteristics can be easily realized only through input of the response parameter Pr.

While the setting operation of the feedback filter 104 in the control-constant set unit 105 is performed based on the gain crossover frequency ωc which is obtained by dividing the speed gain Kv by the inertia value of the mechanical system 3 in the above explanations, the same effect can be obtained by approximation without using a precise inertia value J, for example, in a case where a potential range of the inertia value of the mechanical system 3 is narrow. While the setting operation of the feedback filter 104 in the control-constant set unit 105 is based on the previously-determined phase reference frequency ωq, the same effect can be obtained by setting the phase reference frequency ωq, for example, to an empirical value without beforehand obtaining a precise value of the phase reference frequency ωq. That is, when the control-constant set unit 105 sets the characteristics of the feedback filter 104 to increase the ratio of the filter cutoff frequency ωfL to the filter upper limit frequency ωfH in a range equal to or smaller than one, in other words, to decrease the ratio of the filter upper limit frequency ωfH to the filter cutoff frequency ωfL, as the speed gain Kv increases, the same effect can be obtained.

The above-described control computation unit 102 is configured to cause the amplifier compensation unit 103 to make computation based on a deviation between the speed command vr and the detection speed vb and then cause the feedback filter 104 to respond to the computation result in this order, but this order is not particularly a limitation. That is, the control computation unit 102 may be configured to cause the feedback filter 104 of the transfer function represented by (Expression 3) to respond to a deviation between the speed command vr and the detection speed vb and then subject the output of the filter 104 to computation operations of a proportional-integral control based on the same input/output relation as in (Expression 1), thereby performing of operations by which a transfer function (feedback transfer function) from the detection speed vb to the torque command τr is exactly the same as (Expression 2).

The above-described motor control device 101 has a configuration of a speed control system that conforms the detection speed vb to the speed command vr, but it is needless to mention that the motor control device 101 can be configured as a position control system including the speed control system as a minor loop.

While the amplifier compensation unit 103 performs the proportional-integral computing in the above explanations, it is sufficient to perform computing such as multiplication of an feedback transfer function from the detection speed vb to the torque command τr by the speed gain Kv, and it is needless to mention, integral compensation may be omitted if it is unnecessary in a case where a steady-state deviation is allowable, in a case where it is used as a minor loop for a position control system or in like other cases. Furthermore, it is needless to mention that the features of the first embodiment are not lost at all even when low-pass characteristics of eliminating frequency components sufficiently higher than the filter upper limit frequency ωfH are added to the amplifier compensation unit 103.

As described above, according to the first embodiment, the control computation unit 102 includes: the amplifier compensation unit 103 that performs the computing of multiplying the feedback transfer function by the speed gain Kv; and the feedback filter 104 that has the frequency response characteristics of causing the gain to be substantially one on a lower frequency side than the filter cutoff frequency, reducing the gain as the frequency increases in a range from the filter cutoff frequency ωfL to the filter upper limit frequency ωfH higher than the filter cutoff frequency ωfL, and causing the gain to be substantially constant on a higher frequency side than the filter upper limit frequency ωfH, and that performs the computing of reducing the frequency response gain of the feedback transfer function at higher frequencies than the filter cutoff frequency ωfL, and the control-constant set unit 105 is configured to set the speed gain Kv, the filter cutoff frequency ωfL and the filter upper limit frequency ωfH so as to reduce the ratio of the filter upper limit frequency ωfH to the filter cutoff frequency ωfL as the speed gain Kv increases. Therefore, the frequency range in which the phase of the feedback filter 104 lags is narrowed as the speed gain Kv increases, and thus the high frequency gain of the open-loop transfer function can be reduced as far as possible according to the magnitude of the speed gain Kv without making the phase crossover frequency lowered. Accordingly, even when the inertia of the mechanical load 2 is higher than that of the motor 1 or when it is not higher, or even when there are a plurality of mechanical resonances, the stability can be enhanced as much as possible according to the speed gain Kv. This enables to set the speed gain Kv at a value as high as possible, so that a high-speed and high-accuracy control can be realized for the mechanical system with a range of characteristics as wide as possible. Because the filter cutoff frequency ωfL and the filter upper limit frequency ωfH are set based on the speed gain Kv, it is only necessary to input the response parameter Pr for determining the speed gain Kv as a variable parameter to be set, and therefore the high-speed and high-accuracy control can be realized by simple setting.

Second Embodiment

Figure 6:
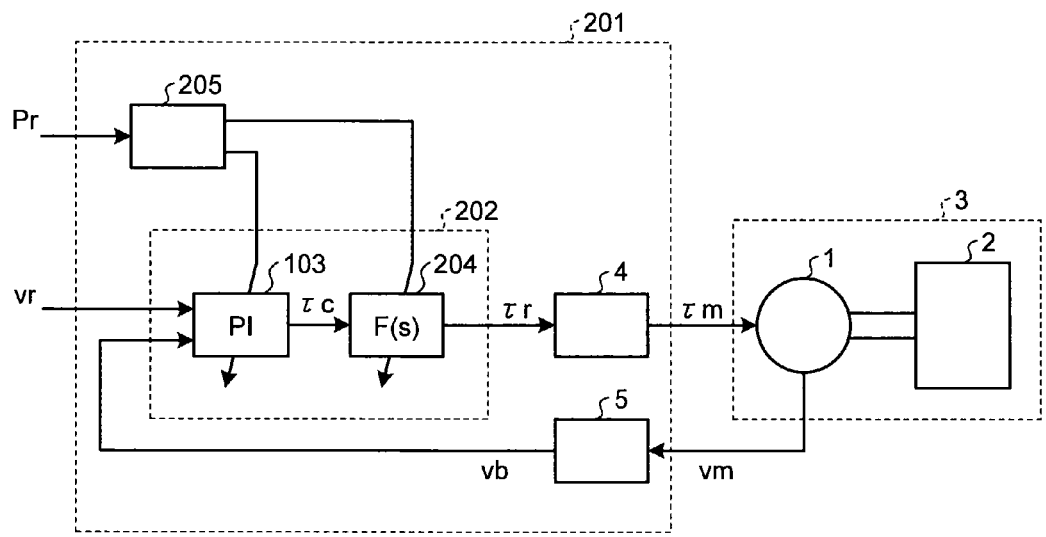
FIG. 6 is a block diagram showing a motor control device according to a second embodiment.

While the feedback filter 104 has a second order configuration in the first embodiment, a motor control device having an equivalent effect can be realized even when the feedback filter 104 has a simpler first order configuration. FIG. 6 is a configuration diagram of a motor control device according to a second embodiment. A motor control device 201 according to the second embodiment has the same configuration as that in the first embodiment except for a control-constant set unit 205 and a control computation unit 202. Constituent elements identical to those of the first embodiment are denoted by the same reference signs and explanations thereof will be omitted.

The control computation unit 202 includes the amplifier compensation unit 103 and a feedback filter 204. The feedback filter 204 is a first-order filter as a replacement for the second-order feedback filter 104 in the first embodiment. The control-constant set unit 205 has a characteristic setting method different from that of the control-constant set unit 105 in the first embodiment because the feedback filter 204 differs from the filter 104 of the first embodiment.

[Feedback Filter 204]

Contents of a computing process performed by the feedback filter 204 are explained below. The feedback filter 204 receives an input of the compensation torque τc outputted by the amplifier compensation unit 103 same as in the first embodiment. A result obtained by performing computing F(s) of a first-order filter represented by the following expression using a filter cutoff frequency ωfL and a filter upper limit frequency ωfH set by the control-constant set unit 205 is outputted as the torque command τr to relatively reduce the gain at higher frequencies than the filter cutoff frequency ωfL. That is, the feedback filter 204 is a first-order filter with the filter cutoff frequency ωfL as a pole and the filter upper limit frequency ωfH as a zero point.

$$F(s)=\{(s/\omega fH)+1\}/\{(s/\omega fL)+1\} \quad \text{(Expression 15)}$$

The filter upper limit frequency ωfH is set equal to or higher than the filter cutoff frequency ωfL. The feedback filter 204 has characteristics of causing the gain to be substantially one in a low frequency region lower than the filter cutoff frequency ωfL, reducing the gain as the frequency increases in an intermediate frequency region from the filter cutoff frequency ωfL to the filter upper limit frequency ωfH, and causing the gain to be a value lower than that in the low frequency region in a high frequency region higher than the filter upper limit frequency ωfH to be substantially constant.

The transfer function F(s) of the feedback filter 204 has phase characteristics of, when the ratio between the filter upper limit frequency ωfH and the filter cutoff frequency ωfL is in a certain range, causing the phase to be between −90 [deg] and 0 [deg] in the intermediate frequency region between the filter upper limit frequency ωfH and the filter cutoff frequency ωfL, causing the phase to approach 0 [deg] as the frequency decreases at lower frequencies than the filter cutoff frequency ωfL, and causing the phase to approach 0 [deg] as the frequency increases at higher frequencies than the filter upper limit frequency. However, unlike the feedback filter 104 in the first embodiment, when the ratio of the filter upper limit frequency ωfH to the filter cutoff frequency ωfL becomes considerably large, the phase gradually approaches −90 [deg] in the center of the intermediate frequency region.

[Control-Constant Set Unit 205]

An operation of the control-constant set unit 205 is explained below. As in the first embodiment, when the response speed of the motor control device 201 is to be set at a higher level, the control-constant set unit 205 sets the speed gain Kv in the amplifier compensation unit 103 of the control computation unit 202 at a larger value based on the response parameter Pr inputted from the external. The control-constant set unit 205 also sets the inverse ωi of the integral time constant in the amplifier compensation unit 103 as in the first embodiment. At the same time, with increase in the speed gain Kv, the filter cutoff frequency ωfL and the filter upper limit frequency ωfH of the feedback filter 204 are set as follow.

As in the first embodiment, the control-constant set unit 205 calculates the upper reference frequency ωH by multiplying the phase reference frequency ωq by the constant rH. In this case, the constant rH is substantially in a range from 0.2 to 1, and the upper reference frequency ωH itself may be previously determined. The control-constant set unit 205 calculates the lower reference frequency ωL by multiplying the gain crossover frequency ωc which is obtained by dividing the speed gain Kv determined according to the input response parameter Pr by the inertia value J of the mechanical system 3, by the previously determined constant rL. The constant rL is set substantially in a range from 1 to 5. That is, the upper reference frequency ωH and the lower reference frequency ωL are calculated according to (Expression 8) and (Expression 9) as in the first embodiment.

If the filter cutoff frequency ωfL is matched with the lower reference frequency ωL and the filter upper limit frequency ωfH is matched with the upper reference frequency ωH, the phase of the feedback filter 204 approaches −90 [deg] and the phase of the open-loop transfer function of the control system is near −180 [deg] in the center of the intermediate frequency region as mentioned above when the speed gain Kv is low and the gain crossover frequency ωc and the phase reference frequency ωq are greatly different from each other. Therefore, oscillation may occur when there is some mechanical resonance of the mechanical load 2 at frequencies near the center of the intermediate frequency region. For this reason, a maximum value Rmax of the ratio between the filter upper limit frequency ωfH and the filter cutoff frequency ωfL is previously defined and then the filter cutoff frequency ωfL and the filter upper limit frequency ωfH are determined as follows.

$$\omega fL=\omega L \quad \text{(Expression 16)}$$

$$\omega fH=\min(R\max\cdot\omega L,\omega H) \quad \text{(Expression 17)}$$

Alternatively, the filter cutoff frequency ωfL and the filter upper limit frequency ωfH are determined as follows.

$$\omega fH=\omega H \quad \text{(Expression 18)}$$

$$\omega fL=\max(\omega H/R\max,\omega L) \quad \text{(Expression 19)}$$

In this case, the symbol "min(a, b)" used above denotes selection of a smaller one of "a" and "b", and "max(a, b)" denotes selection of a larger one of "a" and "b".

Specific Example

Figure 7:
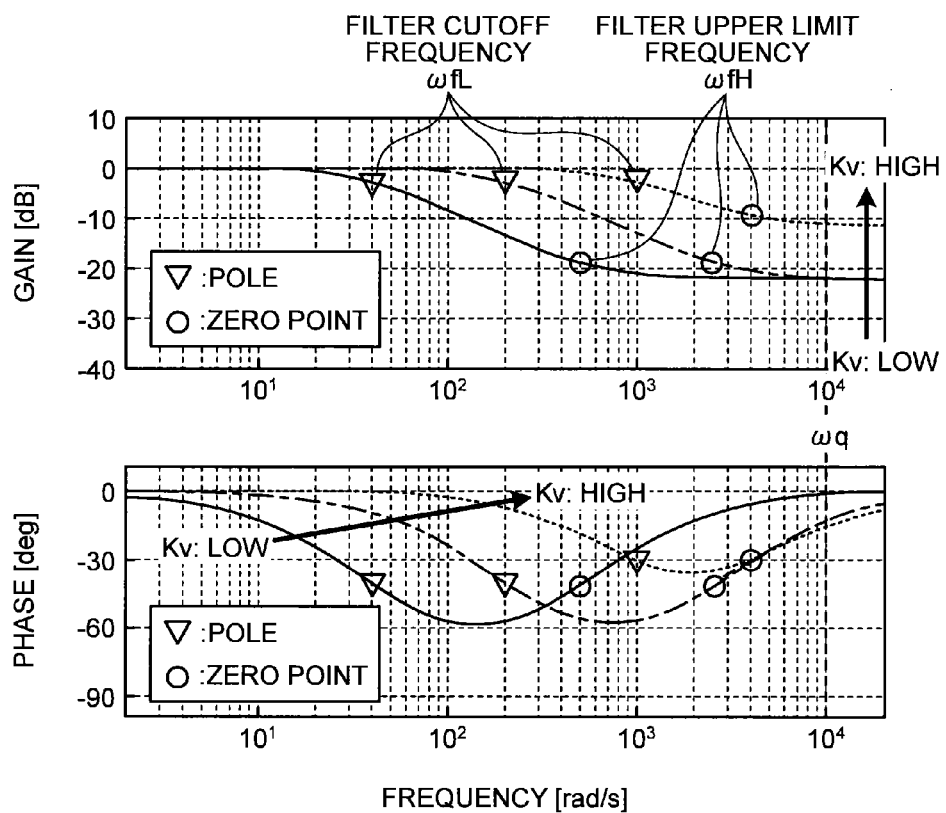
FIG. 7 is a graph showing a frequency response of a feedback filter according to the second embodiment.

FIG. 7 depicts a frequency response of the transfer function F(s) of the feedback filter 204 in a case where the control-constant set unit 205 sets the characteristics of the feedback filter 204 using (Expression 16) and (Expression 17) according to the present embodiment. In this specific example, exactly the same conditions as those in the case shown in FIG. 3 in the first embodiment are used except for the characteristics of the feedback filter 204. A case where the speed gain Kv in the amplifier compensation unit 103 is low is indicated by solid lines, a case where the speed gain Kv is of an intermediate level is indicated by dot-dashed lines, and a case where the speed gain Kv is high is indicated by dotted lines. The gain is shown in an upper part of FIG. 7 and the phase is shown in a lower part thereof. The filter cutoff frequency ωfL, that is, the pole of the feedback filter 204 is plotted with a triangle and the filter upper limit frequency ωfH, that is, the zero point is plotted with a circle on the gain diagram and the phase diagram in each of the conditions.

As shown in FIG. 7, when the solid line indicating the case where the speed gain Kv is low and the dot-dashed line indicating the case where the speed gain Kv is of an intermediate level are compared with each other, there is no change in the ratio between the filter upper limit frequency ωfH indicated by the circle and the filter cutoff frequency ωfL indicated by the triangle as a result of selection of a setting manner using the maximum value Rmax in (Expression 17) in these cases. Accordingly, on the logarithmic axis shown in FIG. 7, the width of the intermediate frequency region mentioned above does not changes and the width of the frequency region in which the phase lags does not change. On the other hand, when the dot-dashed line indicating the case where the speed gain Kv is of the intermediate level and the dotted line indicating the case where the speed gain is high are compared with each other, the ratio of the filter upper limit frequency ωfH to the filter cutoff frequency ωfL decreases with increase in the speed gain Kv. As a result, the intermediate frequency region in which the phase lag is large reduces on the logarithmic axis shown in FIG. 7 with increase in the speed gain Kv.

Figure 8:
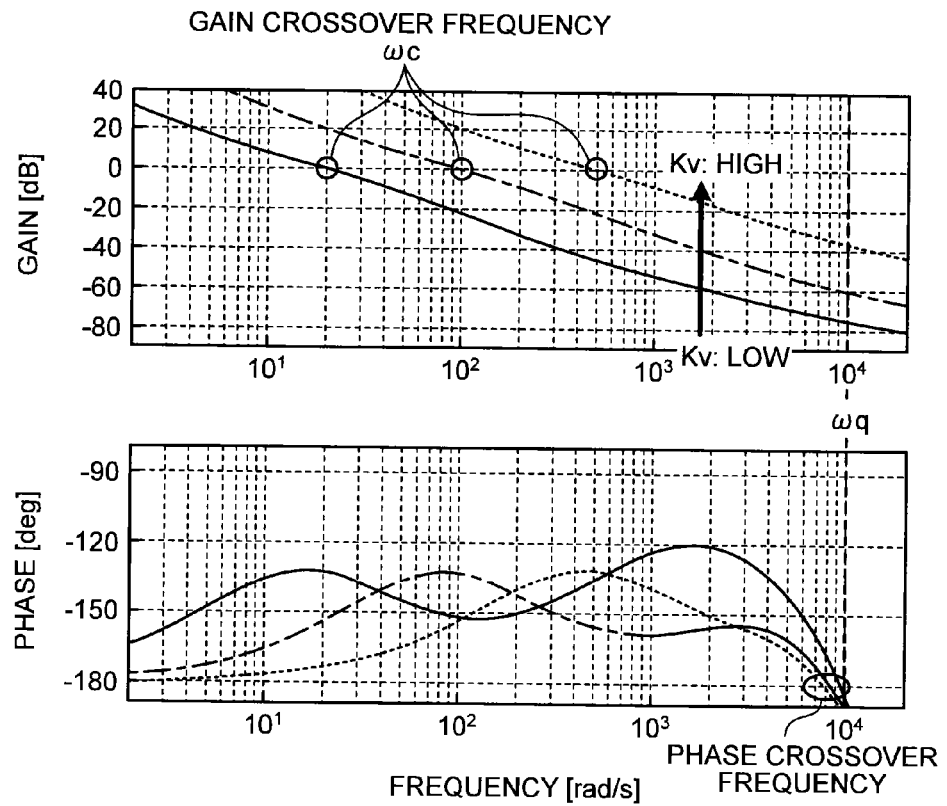
FIG. 8 is a graph showing an open-loop frequency response in the second embodiment.

FIG. 8 depicts a frequency response of the open-loop transfer function of the control system in a case where the mechanical system 3 is an ideal rigid body in the second embodiment, similarly to FIG. 4. Similarly to FIG. 7, a case where the speed gain Kv in the amplifier compensation unit 103 is low is indicated by solid lines, a case where the speed gain Kv is of an intermediate level is indicated by dot-dashed lines, and a case where the speed gain Kv is high is indicated by dotted lines.

As shown in FIG. 8, the phase crossover frequency at which the phase of the open-loop transfer function is −180 [deg] does not greatly change even when the speed gain Kv is changed, as in the first embodiment. Furthermore, in any case, the phase keeps a margin equal to or larger than about 25 [deg] with respect to −180 [deg] up to a frequency slightly lower than the phase crossover frequency at higher frequencies than the gain crossover frequency ωc.

To compare FIG. 8 of the second embodiment with FIG. 4 of the first embodiment, there is a large fluctuation in the phase particularly in the case where the speed gain Kv is low, indicated by the solid line. The gain in the higher frequency region of the case indicated by the solid line is higher than that of the first embodiment shown in FIG. 4. From these facts, it can be understood that the gain reduction effect at high frequencies in the case where the speed gain Kv is low in the second embodiment is smaller than that in the first embodiment. This is because the feedback filter 204 is a first-order filter and it is more difficult to provide desired characteristics in a wide frequency region compared to the case where the feedback filter 104 is a second-order filter in the first embodiment.

However, as shown in FIG. 5 having been explained in the first embodiment, the sufficiently-large gain margin is ensured as in the first embodiment, compared to the case where the feedback filter 204 is brought into a direct transmission state with no filter operation or the case where the feedback filter 204 is replaced by a simple low-pass filter. Accordingly, it is found that higher stability than in other methods is kept even when the mechanical system 3 is different from an ideal rigid body and has some mechanical resonance or even when the high-frequency gain is high due to the low inertia of the motor. Furthermore, such stable control characteristics can be easily realized only by setting the response parameter Pr inputted from the external.

In the explanations of the second embodiment, calculation of Expression 16 or 18 is performed regarding the filter cutoff frequency ωfL and the filter upper limit frequency ωfH as being equal to the lower reference frequency ωL and the upper reference frequency ωH, respectively, for purpose of simplified calculation. However, the filter cutoff frequency ωfL or the filter upper limit frequency ωfH may be calculated by assuming the order n in the explanations of the feedback filter 104 in the first embodiment to be one, setting the constants αp_1 and αz_1 different from 0 or 1 to meet the relation according to Expression 10, and using Expression 11 or 12. With this configuration, while the calculation becomes more complicated, change in phase can be smoothed compared to the characteristics shown in FIG. 8 explained above, and slight improvement can be achieved to cause the characteristics in the case where the order of the feedback filter 204 is one to be close to those described in the first embodiment.

As described above, according to the second embodiment, while the order of the feedback filter 204 is one, the control-constant set unit 205 sets the speed gain Kv, the filter cutoff frequency ωfL, and the filter upper limit frequency ωfH to decrease the ratio of the filter upper limit frequency ωfH to the filter cutoff frequency ωfL as the speed gain Kv increases. Therefore, a high-speed and high-accuracy control can be realized for the mechanical system having a range of characteristics as wide as possible, as in the first embodiment. Because it is only necessary to input the response parameter Pr for defining the speed gain Kv as a variable parameter to be set, the high-speed and high-accuracy control can be realized by simple setting.

Third Embodiment

Figure 9:
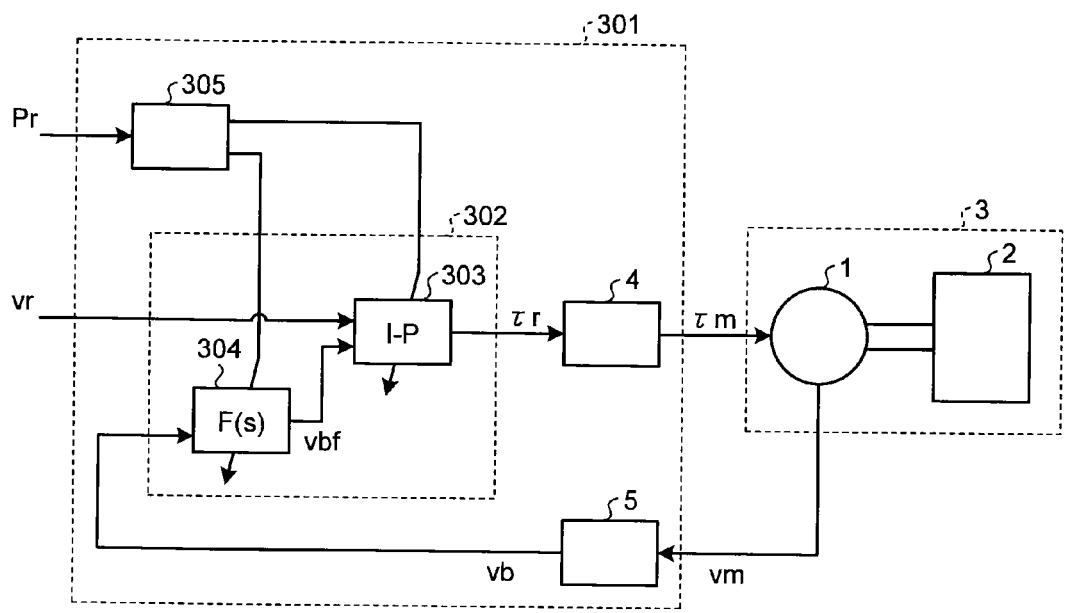
FIG. 9 is a block diagram showing a motor control device according to a third embodiment.

FIG. 9 is a block diagram showing a configuration of a motor control device according to a third embodiment of the present invention. A motor control device 301 according to the third embodiment has the same configuration as that in the first embodiment except for a control-constant set unit 305 and a control computation unit 302. Constituent elements identical to those of the first embodiment are denoted by the same reference signs and explanations thereof will be omitted.

While the feedback filter 104 in the control computation unit 102 receives the output of the amplifier compensation unit 103 as an input and outputs the torque command τr in the first embodiment, a feedback filter 304 in the control computation unit 302 receives the detection speed vb as an input and outputs a filter speed vbf as an intermediate variable in the control computation unit 302 in the third embodiment.

The control computation unit 302 includes an amplifier compensation unit 303 and the feedback filter 304. The feedback filter 304 receives the detection speed vb outputted by the speed detection unit 5 as an input and performs computing of exactly the same transfer function as that in the feedback filter 104 in the first embodiment to output the filter speed vbf. That is, computing according to the following expression is performed.

$$vbf = F(s) \cdot vb \quad \text{(Expression 20)}$$

The amplifier compensation unit 303 performs the same or similar computing as that in the proportional-integral control explained in the first embodiment based on the speed command vr and the filter speed vbf to conform the filter speed vbf with the speed command vr, and outputs a result of the computing as the torque command τr.

While the computing in the amplifier compensation unit 303 may be exactly the same proportional-integral operation as in the amplifier compensation unit 103 in the first embodiment except for the input and the output, it is assumed in the explanations of the present embodiment that computing called I-P control is performed. That is, the compensation torque τr is calculated according to the following expression 21 based the speed command vr and the filter speed vbf.

$$\tau r = Kv \cdot \{(\omega i/s)(vr - vbf) - vbf\} \quad \text{(Expression 21)}$$

By performing the computing called I-P control, an effect to reduce overshoot in the response characteristics of the detection speed vb or the filter speed vbf to the speed command vr can be obtained. Meanwhile, response characteristics to disturbance affecting the mechanical system 3 are exactly the same as those in the case where the PI control is performed.

With the configuration of the present embodiment mentioned above, a feedback transfer function which is a transfer function from the detection speed vb to the torque command τr is represented by the following expression based on (Expression 20) and (Expression 21), though there is a difference in configuration from the first embodiment.

$$\tau r/vb = -Kv \{(s + Kpi)/s\} \cdot F(s) \quad \text{(Expression 22)}$$

That is, the feedback control according to exactly the same transfer function as that of (Expression 2) in the first embodiment is performed. The amplifier compensation unit 303 in the control computation unit 302 performs the computing according to (Expression 22) to multiply the feedback transfer function by the speed gain Kv, and the feedback filter 304 performs the computing according to (Expression 22) to reduce the gain of the feedback transfer function at higher frequencies than the filter cutoff frequency ωfL as in the first embodiment.

Therefore, the control-constant set unit 305 performs exactly the same operation as the control-constant set unit 105 in the first embodiment, whereby the response characteristics to disturbance affecting the mechanical system 3 can be set according to the response parameter Pr in exactly the same manner as in the first embodiment.

When the feedback filter 304 and the control-constant set unit 305 are configured in the same manner as the feedback filter 204 and the control-constant set unit 205 in the second embodiment, respectively, it is needless to mention that the third embodiment can obtain the same effects as the second embodiment.

As described above, according to the third embodiment, even when the feedback filter 304 is provided at the previous stage of the amplifier compensation unit 303, the high-speed and high-accuracy control can be realized for the mechanical system with as wide a range of characteristics as possible as in the first embodiment. Because it is sufficient to input the response parameter Pr for defining the speed gain Kv as a variable parameter to be set, the high-speed and high-accuracy control can be realized by simple setting.

INDUSTRIAL APPLICABILITY

As described above, the motor control device according to the present invention is suitable to be applied for a motor control device that controls the speed and/or position of a motor.

REFERENCE SIGNS LIST 1 motor
2 mechanical load
3 mechanical system
4 torque (drive force) control unit
5 speed detection unit
101, 201, 301 motor control device
102, 202, 302 control computation unit
103, 303 amplifier compensation unit
104, 204, 304 feedback filter
105, 205, 305 control-constant set unit

The invention claimed is:

1. A motor control device that drives a motor included in a control object, the motor control device comprising:
a speed detection unit that detects a motion speed of the motor and outputs a detection speed;
a control computation unit that computes a drive force command for the motor to conform the detection speed with a speed command;
an amplifier compensation unit that performs computing of multiplying a feedback transfer function that is a transfer function from the detection speed to the drive force command by a speed gain Kv within the control computation unit;
a feedback filter that has filter characteristics that a frequency response gain is substantially one at frequencies equal to or lower than a filter cutoff frequency, a frequency response gain decreases with increase in frequency in a range from the filter cutoff frequency to a filter upper limit frequency higher than the filter cutoff frequency, and a frequency response gain is substantially constant at frequencies equal to or higher than the filter upper limit frequency, and performs computing to apply the filter characteristics to the feedback transfer function within the control computation unit;
a control-constant set unit that sets the speed gain Kv and at least one of the filter cutoff frequency and the filter upper limit frequency according to an input from the external; and
a drive-force control unit that drives the motor to match a drive force of the motor with the drive force command, wherein the control-constant set unit sets the speed gain Kv and at least one of the filter cutoff frequency and the filter upper limit frequency to decrease a ratio of the filter upper limit frequency to the filter cutoff frequency with increase in the speed gain Kv.

2. The motor control device according to claim 1, wherein the control-constant set unit sets the filter cutoff frequency based on a gain crossover frequency ωc corresponding to a value obtained by dividing the speed gain Kv by an inertia value of the control object.

3. The motor control device according to claim 2, wherein the control-constant set unit sets the filter upper limit frequency based on a phase reference frequency ωq at which a phase lag occurring between the drive-force control unit and the speed detection unit is substantially 90 [deg].

4. The motor control device according to claim 1, wherein the feedback filter has n (n≥1) poles and zero points as many as the poles, and
the control-constant set unit sets the n poles and the n zero points the feedback filter has in such a manner that the filter cutoff frequency becomes a pole with a minimum absolute value and the filter upper limit frequency becomes a zero point with a maximum absolute value.

5. The motor control device according to claim 4, wherein n is a value equal to or larger than two, and
the control-constant set unit sets the poles and zero points the feedback filter has in such a manner that the pole and the zero point are alternated in an ascending order of absolute values of the poles and zero points.

6. The motor control device according to claim 4, wherein the control-constant set unit calculates a pole $\omega p\_i$ with an ith smallest absolute value and a zero point $\omega z\_i$ with an ith smallest absolute value according to the following expressions, $$\omega p\_i = \{\omega L^{\wedge}(1-\alpha p\_i)\} \cdot \omega H^{\wedge}(\alpha p\_i)$$

$$\omega z\_i = \{\omega L^{\wedge}(1-\alpha z\_i)\} \cdot \omega H^{\wedge}(\omega z\_i)$$

using a lower reference frequency ωL, an upper reference frequency ωH higher than the lower reference frequency ωL, and n constants αp and n constants αz that are previously defined to meet $$0 \leq \alpha p\_1 < \alpha z\_1 < \ldots < \alpha p\_n < \alpha z\_n \leq 1.$$

7. The motor control device according to claim 6, wherein αp_i and αz_i are values obtained by multiplying a predetermined integer by ½ zero time, or one or more times.

* * * * *